United States Patent Office 2,800,501
Patented July 23, 1957

2,800,501

PROCESS FOR PREPARING CYCLOHEXYL-SULFAMIC ACID

Wallace W. Thompson, Wilmington, Del., assignor to E. I. du Pont de Nemours and Company, Wilmington, Del., a corporation of Delaware No Drawing. Application November 5, 1954, Serial No. 467,211

2 Claims. (Cl. 260—500)

This invention relates to the preparation of cyclohexylsulfamic acid by the reaction of cyclohexyl isocyanate with sulfuric acid.

The reaction of the present invention can be represented by the following equation:

$$C_6H_{11}NCO + HOSO_2OH \rightarrow C_6H_{11}NHSO_2OH + CO_2$$

The cyclohexyl isocyanate can be prepared by any standard method. See for example Siefken, Ann. 562, 75–136 (1949).

As is evident from the equation above, at least one equivalent of sulfuric acid is needed for each equivalent of isocyanate. More sulfuric acid can be used and the excess will serve as a solvent and diluent.

Water is undesirable in the reaction because it hydrolyses the product. It is therefore preferred to use 100 percent $H_2SO_4$. Oleum can also be used in strengths up to, say, at least 20 percent $SO_3$. In practice there is no advantage in having a large excess of sulfur trioxide. It is preferred accordingly to use sulfuric acid ranging from 100 percent sulfuric acid to 5 percent oleum.

In mixing the cyclohexyl isocyanate and sulfuric acid it is preferred to add the isocyanate to the sulfuric acid. In other words it is desired to keep an excess of sulfuric acid in the reaction mass during most of the reaction.

The reaction should be conducted at the lowest temperature at which it proceeds at a practical rate. The rate can readily be measured by observing the rate of evolution of carbon dioxide. The temperature can vary widely from, say, —20 to 120° C. The preferred limits of the reaction are about 0 to 60° C. but, as has been noted, the temperature used can be regulated easily by observing $CO_2$ evolution. Actually it will often prove desirable to raise the temperature during the reaction. Thus the temperature should not be so low that the mixture solidifies but again it should not be high enough to cause decomposition or even an undesirably rapid rate of reaction.

The isocyanate can be added step-wise to the sulfuric acid or the rate of addition can be controlled to produce a steady flow of carbon dioxide at the temperatures selected.

The reaction can be carried out at atmospheric pressure. The carbon dioxide evolved can be vented from the reaction continuously and the quantity of carbon dioxide can be measured to determine both the rate and extent of completion of the reaction.

After the evolution of carbon dioxide has substantially stopped the reaction mixture can be treated in any desired way to recover the resulting cyclohexylsulfamic acid.

The reaction mixture can be added to ether and the sulfuric acid-ether mixture can be separated from the cyclohexylsulfamic acid precipitate by filtration.

Or, if preferred, the reaction mixture can be dissolved in water and neutralized with a slurry of lime to give a solution of calcium cyclohexylsulfamate and a precipitate of calcium sulfate. If there is any considerable quantity of sulfuric acid remaining in the mixture it will be preferred to cool this reaction and to prevent undue hydrolysis of the product.

The cyclohexylsulfamic acid can by suitable means be recovered as the sodium or other salts.

In order that the invention may be better understood reference should be had to the following illustrative examples.

Example 1

To 400 parts by weight of oleum containing 2 percent of sulfur trioxide, add with cooling and stirring 125 parts by weight of cyclohexyl isocyanate at such a rate that the temperature does not rise above 20° C. during the addition. Measure the amount of carbon dioxide evolved and continue the reaction until about 40–44 parts of carbon dioxide have been evolved.

Pour the resulting reaction mass, with good agitation, into a mixture of ice and a slurry of lime containing 296 parts by weight of calcium hydroxide. Filter to remove the precipitated calcium sulfate and excess calcium hydroxide, and recover calcium cyclohexylsulfamate from the aqueous filtrate.

Example 2

Add cyclohexyl isocyanate to oleum as in Example 1 and effect reaction. Pour the resulting reaction mass into 2,000 parts by weight of diethyl ether. The cyclohexylsulfamic acid is insoluble and it can be separated by filtration from the mixture of unreacted sulfuric acid and ether.

I claim:

1. In a process for the preparation of cyclohexylsulfamic acid, the steps comprising mixing cyclohexyl isocyanate with anhydrous sulfuric acid, reacting the mixture until carbon dioxide evolution is substantially complete, and recovering cyclohexylsulfamic acid from the reaction mixture.

2. In a process for the preparation of cyclohexylsulfamic acid, the steps comprising mixing cyclohexyl isocyanate with at least one equivalent of sulfuric acid of a strength from 100 percent $H_2SO_4$ to 5 percent oleum, heating the mixture until reaction as evidenced by carbon dioxide evolution is substantially complete, and recovering cyclohexylsulfamic acid from the reaction mixture.

References Cited in the file of this patent

Andrieth and Sveda, J. Org. Chem., 9 (1944), page 100.